US007120589B1

(12) United States Patent
Szabo et al.

(10) Patent No.: US 7,120,589 B1
(45) Date of Patent: Oct. 10, 2006

(54) SYSTEM AND METHOD FOR MANAGING CUSTOMER EXPERIENCE INFORMATION

(75) Inventors: Elizabeth M. Szabo, Austin, TX (US); William B. Bolin, Austin, TX (US); Karen M. Hance, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 09/356,236

(22) Filed: Jul. 16, 1999

(51) Int. Cl.
*G06Q 99/00* (2006.01)
(52) U.S. Cl. .................................................... 705/7
(58) Field of Classification Search ................ 705/1, 705/7, 26, 27, 28, 61, 400, 2, 3, 4, 5, 6; 714/37
See application file for complete search history.

(56) References Cited

U.S. PATENT DOCUMENTS

| 4,799,156 | A | * | 1/1989 | Shavit et al. ................. 705/26 |
| 4,992,940 | A | * | 2/1991 | Dworkin ....................... 705/26 |
| 5,224,206 | A | * | 6/1993 | Simoudis ...................... 705/61 |
| 5,303,166 | A | * | 4/1994 | Amalfitano et al. .......... 702/186 |
| 5,305,199 | A | * | 4/1994 | LoBiondo et al. ............ 705/28 |
| 5,463,768 | A | * | 10/1995 | Cuddihy et al. .............. 714/37 |
| 5,710,887 | A | * | 1/1998 | Chelliah et al. .............. 705/26 |
| 5,758,327 | A | * | 5/1998 | Gardner et al. ............... 705/26 |
| 5,765,033 | A | | 6/1998 | Miloslavsky ............ 395/200.36 |
| 5,799,289 | A | * | 8/1998 | Fukushima et al. ......... 705/400 |
| 5,802,493 | A | * | 9/1998 | Sheflott et al. ................ 705/1 |
| 6,014,658 | A | * | 1/2000 | Pretz ............................. 707/2 |
| 6,023,683 | A | * | 2/2000 | Jhonsn et al. ................. 705/26 |
| 6,038,597 | A | | 3/2000 | Van Wyngarden .......... 709/219 |
| 6,055,519 | A | * | 4/2000 | Kennedy et al. ............. 705/80 |
| 6,088,731 | A | * | 7/2000 | Kiraly et al. ................ 709/229 |
| 6,165,504 | A | * | 12/2000 | Bell ............................ 424/464 |
| 6,307,544 | B1 | * | 10/2001 | Harding ...................... 715/709 |
| 6,340,977 | B1 | * | 1/2002 | Lui et al. ..................... 715/709 |
| 6,615,240 | B1 | * | 9/2003 | Sullivan et al. ............. 709/205 |
| 6,742,141 | B1 | * | 5/2004 | Miller .......................... 714/26 |
| 6,976,056 | B1 | * | 12/2005 | Kumar ........................ 709/206 |
| 2001/0054064 | A1 | * | 12/2001 | Kannan ....................... 709/203 |

FOREIGN PATENT DOCUMENTS

WO     98/35326 A1     8/1998

OTHER PUBLICATIONS

Applying Case-Based Reasoning. Techniques for Enterprise Systems. Author: Ian Watson. Prited in USA 01, 00, 99, 98, 97.*
Applying Case-Based Reasoning. Techniques for Enterprise Systems. Author: Ian Watson, Printed 1997. pp. 178-179.*
Applying Case-Based Reasoning. Techniques for Enterprise Systems. Author: Ian Watson, printed 1997. pp. 23-36 and 89-100.*
SAS Language and Procedures, Introduction Version 6, First Edition, pp. 65-75, printed Sep. 1990.*
"Beyond Help: Making Help a Core Component of a Performance Support System." WexTech Systems, Inc. © 1998.*
Pending U.S. Appl. No. 09/182,403: Jon Boede, Robert Tuttle; "*Built-In Automatic Customer Identifier When Connecting to a Vendor Website*"; Dell USA, L.P, filed Oct. 29, 1998.

* cited by examiner

*Primary Examiner*—Susanna M. Diaz
(74) *Attorney, Agent, or Firm*—Baker Botts L.L.P.

(57) ABSTRACT

A system and method for managing experience information are disclosed. The system and method allow an organization to manage a plurality of issues and the organization's responsiveness to those issues. Moreover, the system and method allow an experience database to be populated with past issues and appropriate responses to those issues. When the organization receives an incoming issue from a source, the incoming issue may be compared against the experience. If a similar experience issue is found in the database, the corresponding appropriate response for the selected experience issue stored in the database may be forwarded to the source in near real time.

16 Claims, 3 Drawing Sheets

SYSTEM AND METHOD FOR MANAGING CUSTOMER EXPERIENCE INFORMATION

TECHNICAL FIELD

The present disclosure relates in general to information management and, more particularly, to a system and method for managing customer experience information.

BACKGROUND

Responsiveness to customer issues and needs has become increasingly important to most modern businesses. Many, if not most, large customer driven organizations maintain a staff of customer service personnel. These staffs may include trouble shooters who can provide technical guidance as well as logistic specialist who can identify why a product was not shipped on time or why a product did not arrive on time.

Typically, as organizations increase in size, the number of customer issues received and the number of customer service personnel responding to those issues also increase. Unfortunately, the increased number of issues and personnel tend to make maintaining a record of customer issues and appropriate responses to those issues more difficult. This may be especially true for multi-national organizations.

At present, conventional data management tools for electronically tracking and reporting customer issues and appropriate responses are inadequate. Customer issue data, if collected at all, is collected in an inconsistent fashion and is, generally, difficult to share cross-functionally or globally. Moreover, the information gleaned from inconsistently collected data cannot confidently be treated as accurate.

Conventional techniques for managing customer issues and experiences include manually inputting an issue and an appropriate response for that issue into a spreadsheet (e.g., an Excel spreadsheet). This technique is inadequate for a number of reasons.

For example, requiring customer service personnel to fill out spreadsheets is labor intensive and time consuming. Additionally, conventional techniques often yield inconsistent and unreliable information. Other shortcomings include storage of data in a format, which often cannot be easily searched or interrogated. As a result, customer service personnel generally find it difficult to identify past issues and resolution data when working to solve a current issue that is similar to a past issue. Moreover, it may be difficult to generate trend reports necessary to identify areas in which the organization has seen either a significant improvement or a significant decline in performance.

SUMMARY

In accordance with the present disclosure, a system and method for managing customer experience information are disclosed that provide significant advantages over prior developed systems. The disclosed embodiments allow an organization to accurately and consistently track experience issues as well as appropriate responses to each of those issues.

According to one aspect of the present disclosure, a number of experience issues may be stored on a storage medium (e.g., a database backend). The storage medium may also contain appropriate responses for each of the experience issues. Preferably, an experience issue and its appropriate response are relationally stored (e.g., linked). If an incoming issue from a source (e.g., a customer corresponding with the storage medium via the Internet) is communicated to the storage medium, a comparable issue may be identified from the plurality of experience issues. Preferably, the comparable issue will: (1) have a response linked to it; and (2) be similar to the incoming issue. Once a comparable issue has been identified, the response associated with the comparable issue, if one exists, may be forwarded to the source. As a result, the incoming issue may receive an appropriate response very quickly. In some cases, the response may appear to be a real-time response.

In one embodiment, if no comparable issue is identified in the storage medium, the incoming issue may be directed to an issue resolution protocol, which preferably includes a number of steps. For example, the protocol may include forwarding the incoming issue to a subject matter expert, receiving a suggested response from the subject matter expert, and sending the suggested response to the source. The protocol could also include other steps. For example, the protocol could include determining if the suggested response is an appropriate response and, if so, adding the incoming issue and the associated response to the experience issues and corresponding appropriate responses stored on the storage medium.

According to another aspect of the present disclosure, an experience database may store data representing a number of experience issues and corresponding appropriate responses for each experience issue. The experience database may be populated in a number of ways. For example, the experience database may be compatible with one or more commercially available spreadsheets. A data gatherer charged with assisting in the population of the experience database may visit customers and manually enter experience issues and appropriate responses to the experience issues into a spreadsheet. The spreadsheet may then be uploaded into the database. Other methods for populating the database may also be employed.

In addition to the experience database, a categorizing engine may be executing on a computing platform and may receive incoming data from a source. Preferably, the categorizing engine is operable to identify specific issues presented by the incoming data. The specific issues may be forwarded to a routing engine. The routing engine, which may also be executing on a computing platform, will preferably be communicatively coupled to the experience database and categorizing engine. In operation, the routing engine may identify from the stored experience issues a comparable issue having an appropriate response and forward the appropriate response to the source.

The disclosed embodiments will preferably allow for the automated inputting of new issues and their corresponding appropriate responses. The disclosed embodiments may, in addition, allow an incoming issue to be compared against experience issues before forwarding the incoming issue to a subject matter expert. As such, the disclosed embodiments provide significant improvements over conventional systems.

For example, much of the labor intensive and time consuming aspects of conventional systems may be automated with the disclosed system and method. Additionally, the disclosed method and system yield a more reliable experience database that allows information to be easily searched and interrogated. As a result, reports necessary to identify areas in which the organization has seen either a significant improvement or a significant decline in performance may be easier to generate.

Other technical advantages will be apparent to those of ordinary skill in the art in view of the following specification, claims, and drawings.

BRIEF DESCRIPTION OF THE DRAWINGS

A more complete understanding of the present disclosure and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4, wherein like numbers are used to indicate like and corresponding parts.

Figure 1:
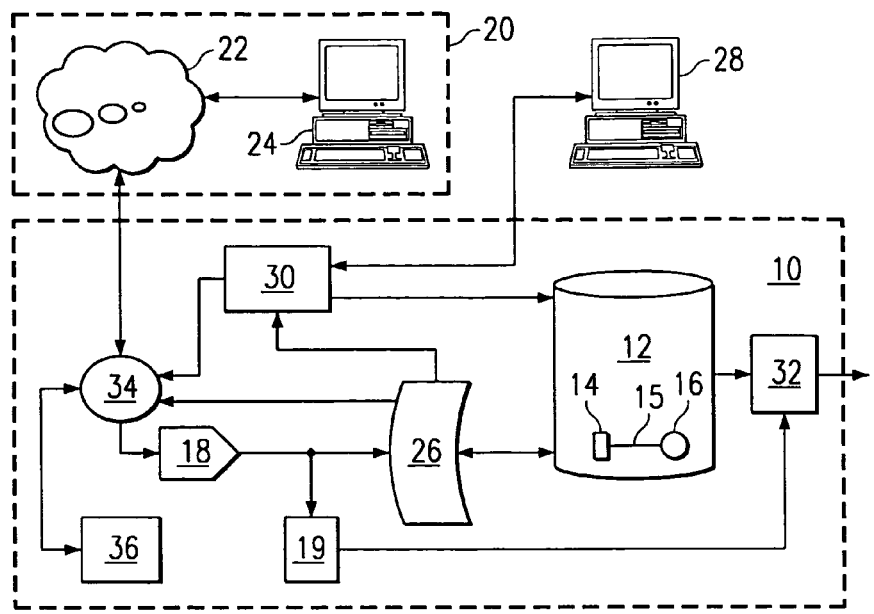
FIG. 1 is a schematic representation of a system, incorporating teachings of the present disclosure, having an experience database operable to store experience issues and corresponding appropriate responses for each experience issue.

FIG. 1 shows a system, representatively depicted at 10, incorporating teachings of the present disclosure. System 10 includes an experience database 12 operable to store various experience issues, one of which is representatively depicted at 14, and corresponding appropriate responses to the respective experience issues, one of which is representatively depicted at 16. As depicted, experience issue 14 may be relationally stored to appropriate response 16 with a data link 15. Though FIG. 1 depicts experience database 12 as the storing medium for experience issue 14 and appropriate response 16, various types of storage medium may be satisfactorily used. For example, storage medium satisfactory for use with a system incorporating teachings of the present disclosure include but are not limited to a computing system's hard drive and a read/write compact disk.

System 10 may also include a categorizing engine 18, which receives incoming data from a source, depicted at 20. The incoming data may present a specific issue to be identified by categorizing engine 18. Identification may occur in a number of different ways. For example, categorizing engine 18 may parse incoming data to identify key words indicative of various categories or core competencies (e.g., delivery issues, relationship building issues, order experience issues, service related issues, technical support issues, quality/reliability issues, and "I wish" issues). Once a specific issue has been identified by categorizing engine 18, the specific issue may be forwarded to a queue 19. Queue 19 may be operable to store a list of specific issues.

Categorizing engine 18 may be communicatively coupled to source 20 via a server (e.g., external network server 34 or an electronic mail server). As depicted in FIG. 1, source 20 includes an external network cloud 22 (e.g., the Internet) and a remote computing system 24 communicatively coupled to categorizing engine 18 via external network cloud 22. The connection may be through a website operated by an organization seeking to track experience issues.

FIG. 1 also depicts a routing engine 26, which may be executing on a computing platform. Routing engine 26 may be communicatively coupled to both categorizing engine 18 and experience database 12. When routing engine 26 receives a specific issue from categorizing engine 18, routing engine 26 compares the specific issue against the various experience issues stored in experience database 12. If routing engine 26 identifies a comparable issue (i.e., an issue that is at least similar to the specific issue) from the various experience issues (e.g., experience issue 14), routing engine 26 may return to source 20 the appropriate response (e.g., response 16) associated with the comparable experience issue. As depicted in FIG. 1, the return path contains external network server 34.

If routing engine 26 does not identify a comparable issue from the various experience issues, routing engine 26 may forward the specific issue through tracking engine 30 to a subject matter expert (SME) 28 identified as being capable of responding to issues like the specific issue identified by categorizing engine 18.

In operation, SME 28 may offer a suggested response to the specific issue. The suggested response may be forwarded back to source 20 through tracking engine 30 and external network server 34. If tracking engine 30 determines that the suggested response resolved source 20's specific issue, tracking engine 30 may add the specific issue and the suggested response to experience database 12. If tracking engine 30 determines that the suggested response did not resolve source 20's specific issue, tracking engine 30 may forward the specific issue back to SME 28 for a second suggested response. Tracking engine 30 may also be able to escalate the SME responding cycle. For example, tracking engine 30 may expedite SME 28's delivery of a second suggested response or request a response from a more senior SME.

System 10 may also include various report generating engines, such as graphing engine 32. Graphing engine 32 may be communicatively coupled to experience database 12 and may be able to automatically generate graphs illustrating selected data stored in experience database 12. Graphing engine 32 may also be communicatively coupled to queue 19 and operable to automatically generate graphs that provide visual representations of specific issues identified by categorizing engine 18. For example, an automatically generated graph of queue 19 data may breakout specifics issues by core competencies (e.g., the graph of FIG. 2).

System 10 may also include various issue gathering engines, such as proactive engine 36. Proactive engine 36 may be communicatively coupled to external network server 34 and may be able to observe a party surfing an internet website that provides information about an organization, which employs system 10. Preferably, proactive engine 36 will be able identify a surfer who seems unable to find a desired piece of information. Perhaps, the surfer has been on a site for an inordinate amount of time or has been moving all around the website while only staying on any one page for a very short period of time. Once a "lost" surfer has been identified, proactive engine 36 may prompt the surfer to submit incoming data, which proactive engine 36 may forward to categorizing engine 18 for further processing.

Figure 2:
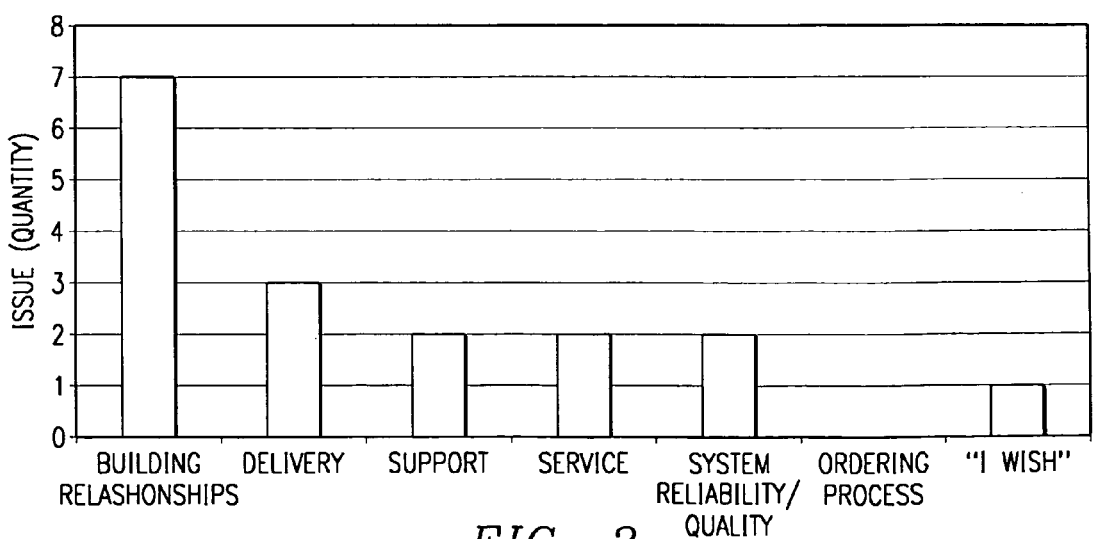
FIG. 2 shows a graph that may be automatically generated by an experience management system in accordance with teachings of the present disclosure.

FIG. 2 shows a graph that may be automatically generated by a system that incorporates teachings of the present disclosure for managing customer experience information. The graph of FIG. 2 breaks out specific issues by organizationally defined core competencies.

Figure 3:
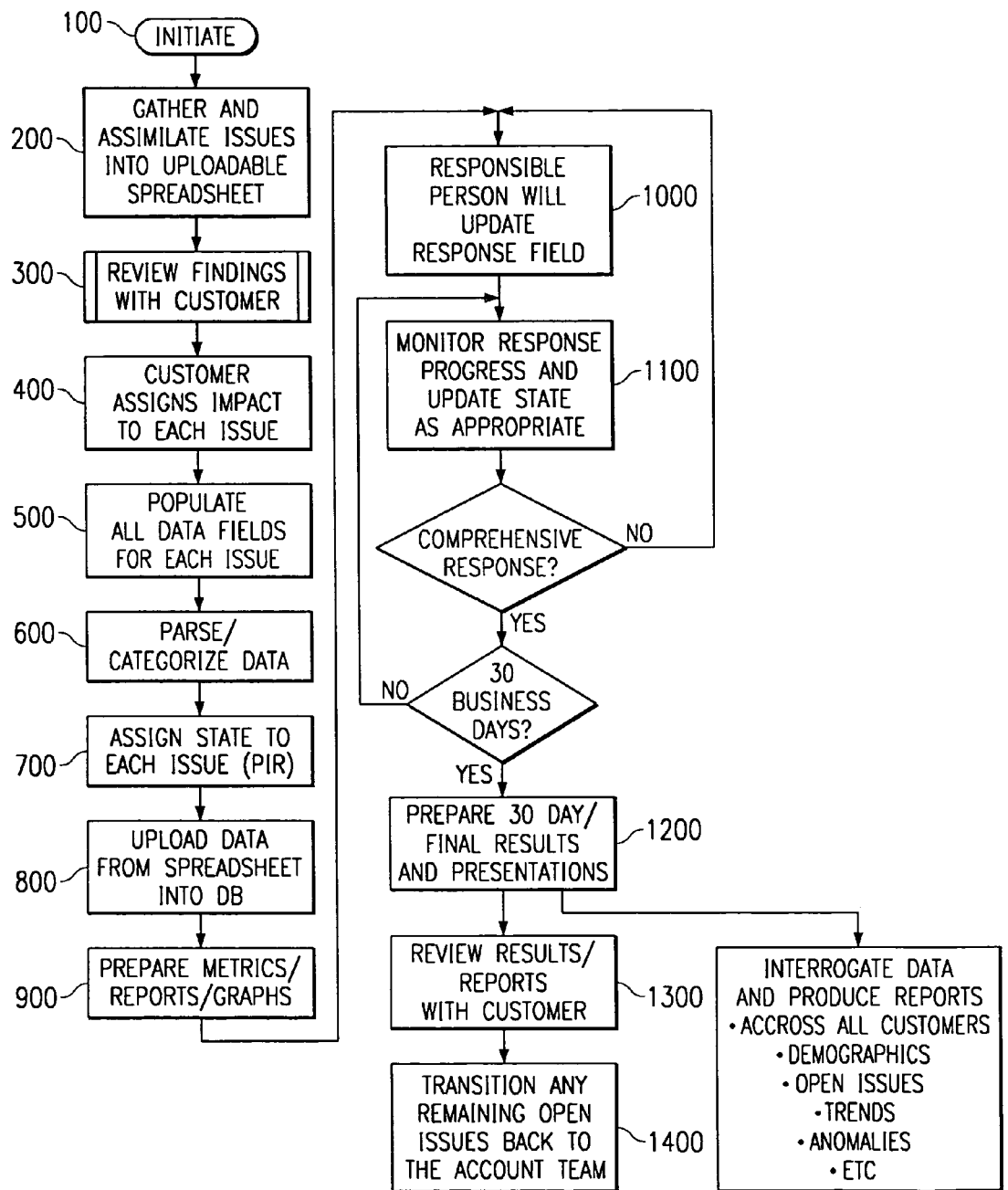
FIG. 3 shows a flow diagram depicting a method for populating a database that may be a component of a system incorporating teachings of the present disclosure.

FIG. 3 shows a flow diagram depicting a method for populating a database, which may be a component of a system incorporating teachings of the present disclosure. The method depicted in FIG. 3 may represent the initial populating of the experience database and may also represent update populating of the experience database.

At step 100, a representative of an organization seeking to populate a storage medium with experience issues and appropriate responses may meet with a customer of the organization. At step 200, experience issues may be gathered and placed into an uploadable spreadsheet. To ensure that the experience issues have been properly recorded, the customer and representative may review the recorded experience issues at step 300.

If the experience issues are correctly recorded, the customer may seek at step 400 to prioritize the issues by applying a weighting factor (e.g., impact rating). The weighting factor, and specifically the impact rating, provide an indication of how important given experience issues may be to the customer. At step 500, all the fields of the spreadsheet may be populated and the data at step 600 may be placed into broad categories. These broad categories may include, for example, delivery issues, relationship building issues, order experience issues, service related issues, technical support issues, quality/reliability issues, and "I wish" issues.

Once categorized, the experience issue may at step 700, be assigned a state. By considering the assigned state in conjunction with the applied weighting factor of step 400, an organization may be able to determine a project incident rating (PIR) that will allow the organization to determine how well and how quickly it identifies an appropriate response to the experience issue. At step 800, the categorized and state-assigned experience issues may be uploaded into an experience database.

Once uploaded, the experience issues may support graphing. For example, at step 900, data may be extracted and used to provide customer specific reports. The experience issues may also be forwarded at step 1000 to a responsible person who may, for example, be a subject matter expert (SME). The SME will preferably provide responses to specific issues. When providing a response, the SME may only be required to update a response field in the database. Preferably, this response field is linked to the issue to which it responds.

At step 1100, the appropriate response may be monitored (e.g., how comprehensive is the response or how quickly was the response provided). At step 1200, a final report may be generated. At step 1300, the reports may be reviewed with the customer. Step 1200 may occur at arbitrary times or at a fixed time (e.g., thirty days after step 200). The final report may, as shown at step 1500, include charts and graphs that are comprehensive, demographic specific, report only open issues, or show trends and anomalies.

To the extent open issues exist, the open issues may be forwarded at step 1400 to an account team or some other entity responsible for closing out open issues. The population method of FIG. 3 may be supplemented or replaced with other population techniques.

Figure 4:
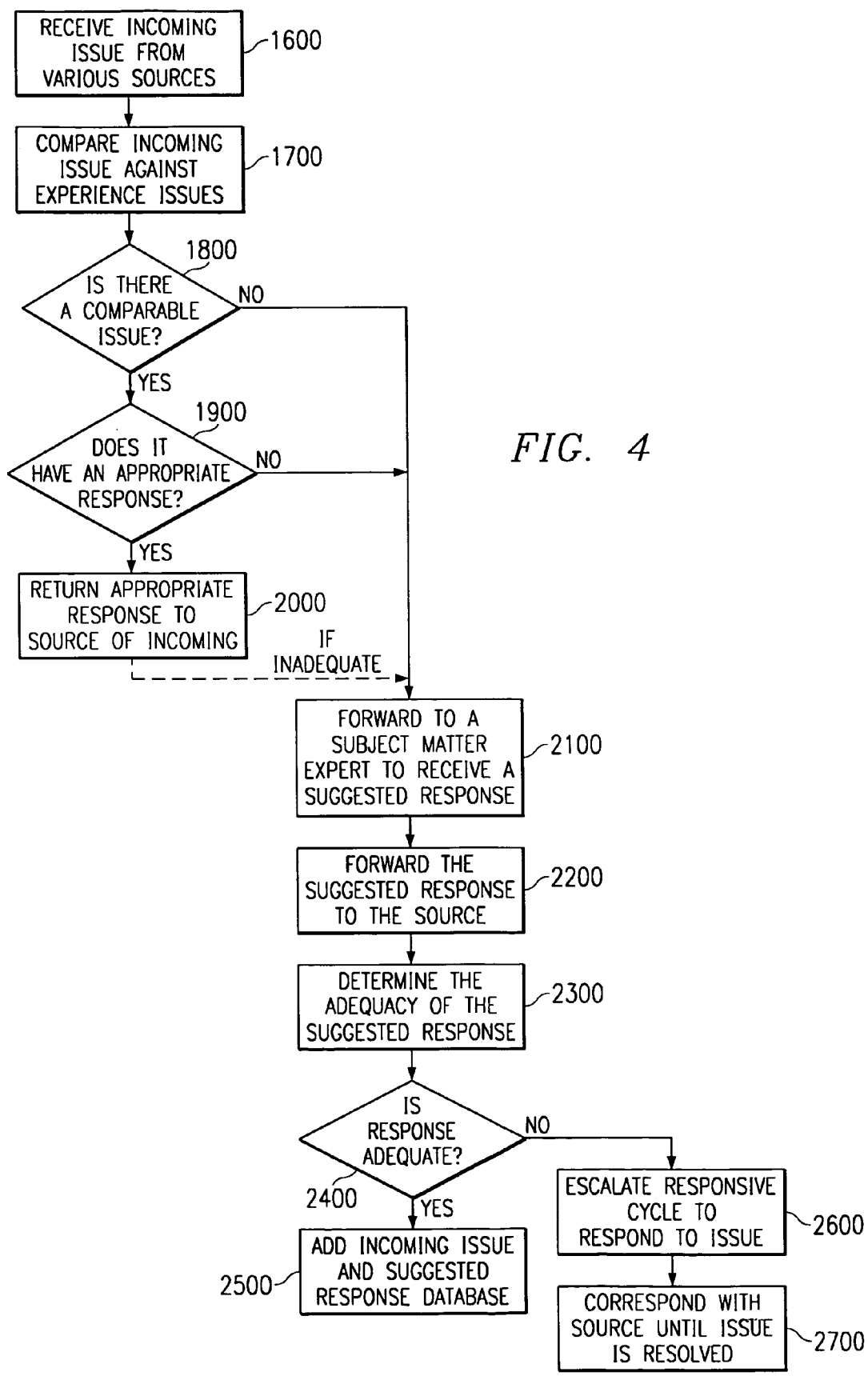
FIG. 4 shows a flow diagram depicting a method incorporating teachings of the present disclosure for responding to incoming issues.

FIG. 4 shows a flow diagram depicting a method incorporating teachings of the present disclosure for responding to incoming user issues. The method of FIG. 4 may also be a technique for populating an experience database.

At step 1600, an incoming issue may be received. The issue may arrive from a number of sources (e.g., an internet website, an uploaded spreadsheet, or an electronic mail repository). Moreover, the incoming issue may arrive as a clearly defined issue or as data from which a specific issue must be identified.

At step 1700, the incoming issue may be compared against experience issues stored in an experience database. Preferably, each of the experience issues are linked to an appropriate response. Whether a comparable experience issue has an appropriate response may be determined at step 1900 and the appropriate response for the comparable experience issue, if it exists, may be forwarded to the source of the incoming issue at step 2000. Preferably, the adequacy of the appropriate response will be determined, and, if inadequate, the incoming issue may be forwarded to a subject matter expert for further processing.

If no comparable experience issue can be identified at step 1800 or the incoming issue is determined to lack an appropriate response at step 1900, the incoming issue may be forwarded at step 2100 to a subject matter expert at an early step in an issue resolution protocol. Preferably, the incoming issue will have been categorized to facilitate forwarding to an appropriate SME who can provide a suggested response. When, at step 2100, an SME provides a suggested response, the suggested response may be forwarded at step 2200 to the source of the incoming issue to determine the adequacy (at step 2300) of the suggested response.

If the suggested response is found to be appropriate at step 2400, the incoming issue and the suggested response may be added to the experience database. If, however, the suggested response is found to be inadequate, the incoming issue may be directed to an escalation process at step 2600.

The escalation process at step 2600 may expedite the submission of subsequent suggested responses. The escalation process may also involve continued correspondence, represented at step 2700, between the source and the organization until an appropriate response is found or the issue is determined to be without an adequate solution.

Although the present invention has been described in detail, it should be understood that various changes, substitutions and alterations can be made thereto without departing from the spirit and scope of the invention as defined by the appended claims.

What is claimed is:

1. A method for managing and tracking incoming issues through management of an experience database, the method comprising:

storing a plurality of experience issues related to computer systems and corresponding appropriate responses for each of the experience issues in the experience database, the experience issues categorized into a plurality of experience issues comprising delivery issues, relationship building issues, and order experience issues;

assigning a weighting factor to each experience issue to prioritize each experience issue based upon the importance of each experience issue to a particular customer;

monitoring, via a proactive engine, website activity of a user at a source, the at least one source communicatively coupled to the experience database;

prompting the user of the monitored source to submit at least one experience issue based upon the monitored activity when, based upon the monitored website activity of the user, the proactive engine has inferred that the user might need assistance;

receiving the at least one incoming experience issue from the at least one source;

categorizing each incoming issue using a categorizing engine to parse each incoming issue to identify key words for automatically categorizing the received experience issue, the categorizing engine executing on a computing platform;

identifying a comparable experience issue with a routing engine executing on a computing platform, the experience issue having an appropriate response from the experience database;

returning the appropriate response to the source of the incoming issue; and reporting the activities of the experience database for the user according to the categorized experience issues and weighting factors using a graphing engine executing on a computing platform and communicatively coupled to the experience database.

2. The method of claim 1, further comprising:

when no comparable experience issue exists in the experience database for a particular incoming issue, routing the particular incoming issue through an issue resolution protocol, which includes forwarding the incoming user issue to a subject matter expert for a suggested response; and sending the suggested response to the source.

3. The method of claim 2, wherein forwarding the incoming issue to a subject matter expert comprises accessing an internal network cloud.

4. The method of claim 2 wherein the issue resolution protocol further includes prompting the source to review the suggested response and to indicate whether the suggested response resolves the particular incoming issue.

5. The method of claim 1, further comprising:

when no comparable experience issue exists in the experience database, forwarding the incoming issue via electronic mail to a subject matter expert for a suggested response;

sending the suggested response to the source;

determining whether the suggested response resolved the incoming issue; and if the suggested response resolved the incoming issue, adding the incoming issue and suggested response to the experience database.

6. The method of claim 1, wherein the incoming issue relates to using a computing system.

7. The method of claim 1, wherein the incoming issue relates to purchasing a computing system.

8. The method of claim 1 further comprising periodically generating a report showing the number and type of experience issues requests responded to over a selected period.

9. The method of claim 8 wherein the selected period comprises a day.

10. A system for managing experience information, comprising:

an experience database comprising a plurality of experience issues related to computer systems and corresponding appropriate responses for each experience issue in the experience database, the experience issues categorized into a plurality of experience issues comprising delivery issues, relationship building issues; and order experience issues, each experience issue assigned a weighting factor to prioritize each experience issue based upon the importance of each issue to a particular customer;

a proactive engine operable to monitor website activity of a user at a source and to prompt the user of the source to submit experience issues when, based upon the monitored website activity of the user, the proactive engine has inferred that the user might need assistance;

a categorizing engine executing on a computing platform operable to receive a plurality of incoming issues from the source, the categorizing engine further operable to parse each incoming issue to identify key words for automatically identifying a specific issue presented by each incoming issue;

a routing engine executing on a computing platform and communicatively coupled to the experience database and categorizing engine;

the routing engine operable to automatically identify from the plurality of experience issues stored in the experience database a comparable experience issue that approximates at least one of the incoming issue and has an appropriate response;

the routing engine further operable to automatically return the appropriate response to the source in approximately real time; and a graphing engine executing on a computing platform and communicatively coupled to the experience database for reporting the activities of the experience database for the user according to the categorized experience issues and the associated weighting factors.

11. The system of claim 10, wherein the source communicates with the categorizing engine via an electronic mail server.

12. The system of claim 10, wherein the source comprises a remote computing system communicatively coupled to the categorizing engine via an external network server.

13. The system of claim 10, further comprising the routing engine operable to forward specific incoming issues to a subject matter expert for a suggested response if no comparable experience issue exists in the experience database.

14. The system of claim 13, further comprising:

a tracking engine executing on a computing platform and communicatively coupled to the experience database; and the tracking engine operable to receive the suggested response from the subject matter expert and to send the suggested response to the source.

15. The system of claim 13, further comprising:

the tracking engine operable to determine whether the suggested response resolved the specific incoming issue;

when the suggested response resolves the specific issue, adding the specific incoming issue and the suggested response to the experience database; and when the suggested response does not resolve the specific issue, forwarding the specific incoming issue back to the subject matter expert.

16. The system of claim 10, further comprising:

a proactive engine executing on a computing platform, the proactive engine communicatively coupled to the categorizing engine and an external network server, the proactive engine operable to:

observe an individual accessing an information site communicatively coupled to the external network server;

prompt the individual to submit an issue for resolution; and act as a source by forwarding the submitted issue as incoming data to the categorizing engine.

* * * * *